United States Patent
Sugiyama (10) Patent No.: US 11,320,715 B2
(45) Date of Patent: May 3, 2022

(54) OPTICAL DEVICE THAT INCLUDES OPTICAL MODULATOR

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 79 days.

(21) Appl. No.: 16/897,432

(22) Filed: Jun. 10, 2020

(65) Prior Publication Data

US 2021/0011352 A1 Jan. 14, 2021

(30) Foreign Application Priority Data

Jul. 11, 2019 (JP) ............................ JP2019-129577

(51) Int. Cl.
G02F 1/225 (2006.01)
G02F 1/21 (2006.01)

(52) U.S. Cl.
CPC .............. *G02F 1/225* (2013.01); *G02F 1/212* (2021.01); *G02F 2202/022* (2013.01)

(58) Field of Classification Search
CPC ..... G02F 1/212; G02F 1/225; G02F 2202/022
See application file for complete search history.

(56) References Cited

U.S. PATENT DOCUMENTS

| 5,729,641 | A  | * | 3/1998 | Chandonnet | ............ | G02F 1/011 |
|-----------|----|---|--------|------------|--------------|-----------|
|           |    |   |        |            |              | 385/1 |
| 6,731,841 | B1 | * | 5/2004 | Shirk      | ...............| G02B 6/125 |
|           |    |   |        |            |              | 385/39 |
| 9,535,213 | B2 | * | 1/2017 | Sugiyama   | ............. | G02F 1/2255 |
| 2004/0057683 | A1 |   | 3/2004 | Shimizu et al. | | |
| 2014/0035175 | A1 |   | 2/2014 | Numata et al. | | |
| 2015/0104177 | A1 | * | 4/2015 | Kato       | .................... | G02B 6/4246 |
|           |    |   |        |            |              | 398/79 |
| 2015/0261062 | A1 | * | 9/2015 | Sugiyama   | ............. | G02F 1/2255 |
|           |    |   |        |            |              | 385/14 |
| 2017/0108757 | A1 | * | 4/2017 | Ishii      | ....... | G02F 1/2255 |

(Continued)

FOREIGN PATENT DOCUMENTS

JP 2004-109926 4/2004

OTHER PUBLICATIONS

Olanrewaju et al., Capillary microfluidics in microchannels: from microfluidic networks to capillaric circuits, Lab Chip, 2018, 18, 2323 (Year: 2018).*

(Continued)

*Primary Examiner* — Peter Radkowski
(74) *Attorney, Agent, or Firm* — Staas & Halsey LLP (57) ABSTRACT

An optical device includes an optical modulator formed on an optical IC chip. A shape of the IC chip is a rectangle or a parallelogram. The optical modulator includes an interferometer, wiring patterns, a first polymer pattern, and a second polymer pattern. The interferometer includes an optical waveguide that is formed in a direction from a first edge to a second edge of the optical IC chip. The wiring patterns are formed parallel to the optical waveguide. The first polymer pattern is formed along the first edge or the second edge. The second polymer pattern is connected to the first polymer pattern and formed on the optical waveguide without overlapping the wiring patterns.

5 Claims, 12 Drawing Sheets

(56) References Cited

U.S. PATENT DOCUMENTS

2017/0227724 A1* 8/2017 Yamaji ................. H04B 10/505
2018/0031945 A1* 2/2018 Ohmori ................. G02F 1/2255

OTHER PUBLICATIONS

Ye et al., Capillary flow control in nanochannels via hybrid surface,: RSC Adv., 2016, 6, 2774 (Year: 2016).*

Zheng et al., Novel planarization and passivation in the integration of III-V semiconductor devices, Optoelectronic Integrated Circuits VIII, 2004, Photonic West, Proc. SPIE V. 5356 (Year: 2004).*

Moody et al., Deformation and Delamination in Polymer Metal Thin Film Structures, Symposium on Thin Films on Compliant Substrates ICMCTF San Diego, CA Apr. 23-27, 2012 (Year: 2012).*

Zhang et al., Numerical study on flow rate limitation of open capillary channel flowthrough a wedge, Advances in Mechanical Engineering 2016, vol. 8(4) 1-11 (Year: 2016).*

\* cited by examiner

OPTICAL DEVICE THAT INCLUDES OPTICAL MODULATOR

CROSS-REFERENCE TO RELATED APPLICATION

This application is based upon and claims the benefit of priority of the prior Japanese Patent Application No. 2019-129577, filed on Jul. 11, 2019, the entire contents of which are incorporated herein by reference.

FIELD

The embodiments discussed herein are related to an optical device that includes an optical modulator.

BACKGROUND

An optical modulator is one of key devices for implementing an optical communication system. The size of optical modulators is required to be reduced to reduce the size of optical transmission devices implemented in nodes in the optical communication system.

Forming optical modulators on silicon substrates has been put into practical use as one technique for attaining size reduction of the optical modulators. In such a configuration, an optical waveguide is formed on a silicon substrate, and an electrode and a PN junction are provided in the vicinity of the optical waveguide. The refractive index of the optical waveguide is dependent on an electric field applied to the PN junction. Thus, applying an electric-field signal indicating data to the PN junction causes light passing through the optical waveguide to be modulated in accordance with the electric-field signal. Thus, a modulated optical signal indicating the data is generated.

However, a change in the refractive index of the optical waveguide is small relative to a change in the electric field applied to the PN junction. Hence, implementing sufficient modulation involves increasing the drive voltage of a signal to be applied to the PN junction, resulting in large power consumption. To solve or reduce this problem, an optical modulator using a polymer (i.e., polymeric material), instead of a PN junction, has been proposed. For example, a polymer may be formed on optical waveguides forming a Mach-Zehnder interferometer. An electric-field signal indicating data is applied to the polymer. The refractive index of the optical waveguide changes greatly based on a change in the electric field applied to the polymer. Hence, this configuration implements sufficient modulation without increasing the drive voltage.

A method for fabricating a low-cost polymer optical waveguide with a low loss in guided waves has been proposed as a relevant technique (e.g., Japanese Laid-open Patent Publication No. 2004-109926). A method for forming a single-mode polymer waveguide array assembly has also been proposed (e.g., US 2014/0035175).

Sufficient modulation is implemented without increasing a drive voltage in a configuration in which, as described above, the refractive index of an optical waveguide is changed using a polymer formed on the optical waveguide. However, the polymer is formed on the optical IC (Integrated Circuit) chip without overlapping wiring patterns (or metal interconnections) for propagating a drive signal or wiring patterns for grounding. Hence, a long metal wire may be needed to electrically connect the wiring pattern and a circuit external to the optical IC chip. The long metal wire leads to a high characteristic impedance, thereby making it difficult to attain impedance matching. As a result, the bandwidth of the optical modulator will be narrow if reflection of an electric signal occurs on the optical IC chip due to impedance mismatching.

SUMMARY

According to an aspect of the embodiments, an optical device includes an optical modulator formed on an optical IC chip shaped like a rectangle or a parallelogram. The optical modulator includes an interferometer that includes an optical waveguide formed in a direction from a first edge to a second edge of the optical IC chip, wiring patterns that are formed parallel to the optical waveguide, a first polymer pattern that is formed along the first edge or the second edge, and a second polymer pattern that is connected to the first polymer pattern and formed on the optical waveguide without overlapping the wiring patterns.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
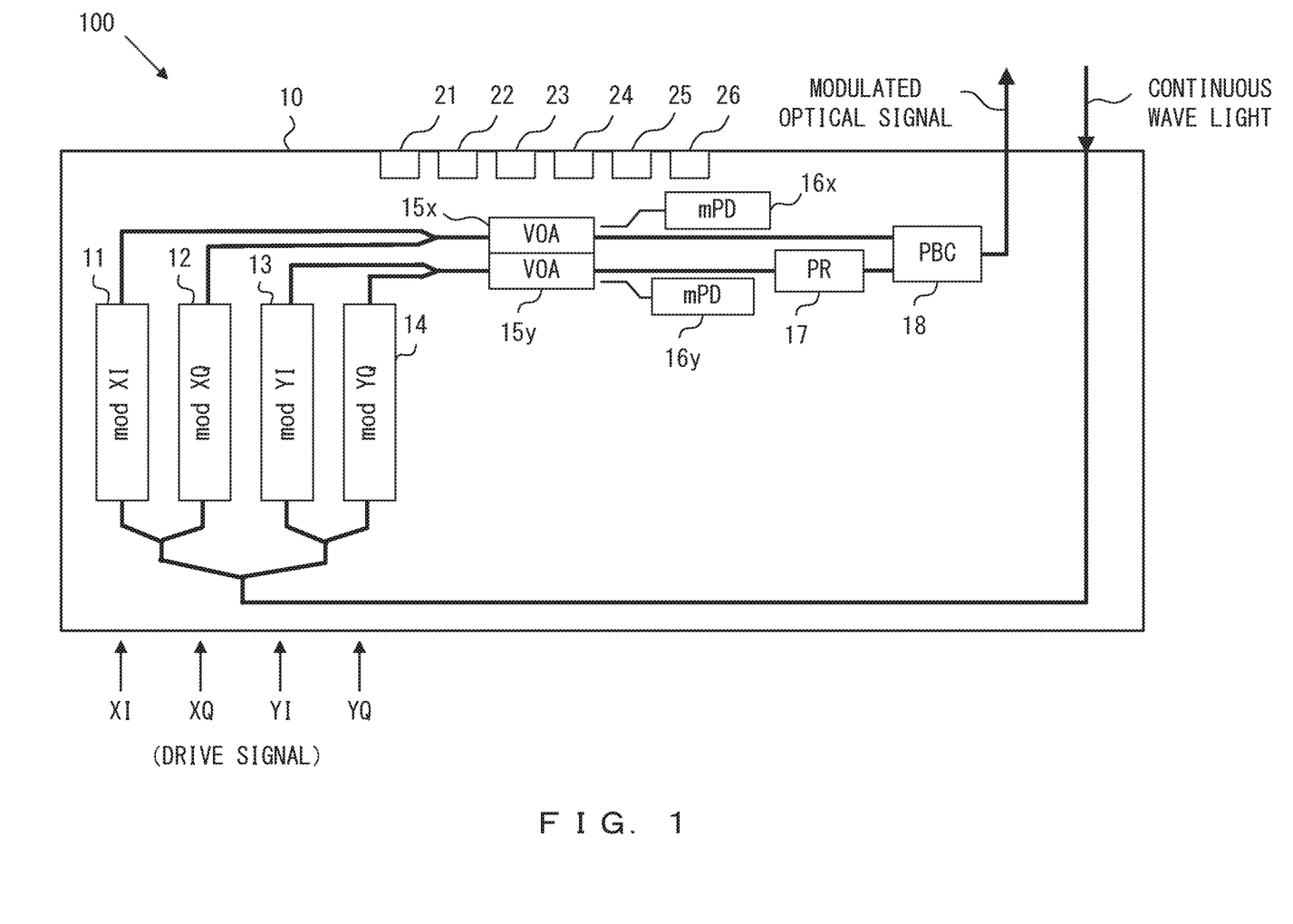
FIG. 1 illustrates an example of an optical device in accordance with embodiments of the invention.

FIG. 1 illustrates an example of an optical device in accordance with embodiments of the invention. An optical device 100 in accordance with embodiments of the invention includes an optical modulator formed on an optical IC chip 10. In this example, the optical IC chip 10 is formed on a silicon wafer. In this case, a plurality of optical IC chips are formed on the silicon wafer. Thus, the optical IC chip 10 is one of the plurality of optical IC chips cut out of the silicon wafer. In this example, the optical modulator generates a polarization multiplexed optical signal.

As depicted in FIG. 1, the optical modulator includes modulators 11-14, variable optical attenuators (VOAs) 15x and 15y, monitor photodetectors (mPDs) 16x and 16y, a polarization rotator (PR) 17, and a polarization beam combiner (PBC) 18. The optical modulator may include other elements that are not depicted in FIG. 1.

In this example, the optical IC chip 10 is shaped like a rectangle. However, the present invention is not limited to this configuration. For example, the optical IC chip 10 may be shaped like a parallelogram.

The modulators 11-14 are optically coupled to an input port via an optical waveguide. Accordingly, continuous wave light is input to the modulators 11-14. The modulators 11, 12, 13, and 14 are respectively supplied with drive signals XI, XQ, YI, and YQ. The drive signals XI and XQ are generated according to a data signal X. The drive signals YI and YQ are generated according to a data signal Y. The modulator 11 generates a modulated optical signal XI by modulating the input continuous wave light with the drive signal XI. Similarly, the modulators 12, 13, and 14 generate modulated optical signals XQ, YI, and YQ, respectively.

The modulated optical signals XI and XQ are combined to generate a modulated optical signal X. In this case, the modulated optical signals XI and XQ are combined to have a specified phase difference between these signals by a bias supplied via a pad 21. The modulated optical signal X indicates the data signal X. Similarly, the modulated optical signals YI and YQ are combined to generate a modulated optical signal Y. In this case, the modulated optical signals YI and YQ are combined to have a specified phase difference between these signals by a bias supplied via a pad 22. The modulated optical signal Y indicates the data signal Y.

The variable optical attenuator 15$x$ adjusts power of the modulated optical signal X. Similarly, the variable optical attenuator 15$y$ adjusts power of the modulated optical signal Y. In this case, for example, the variable optical attenuators 15$x$ and 15$y$ may equalize the powers of the modulated optical signals X and Y in accordance with power control signals supplied via the pads 23 and 24.

The monitor photodetector 16$x$ detects the power of the modulated optical signal X. Similarly, the monitor photodetector 16$y$ detects the power of the modulated optical signal Y. The powers detected by the monitor photodetectors 16$x$ and 16$y$ are reported to a controller (not illustrated) via pads 25 and 26. In response to this, the controller generates power control signals for controlling the variable optical attenuators 15$x$ and 15$y$.

The polarization rotator 17 controls the polarization of the modulated optical signal X or Y. In this example, the polarization rotator 17 controls the polarization of the modulated optical signal Y. As an example, the polarization rotator 17 may control the polarization of the modulated optical signal Y in a manner such that the polarizations of the modulated optical signals X and Y become orthogonal to each other. The polarization beam combiner 18 generates a polarization multiplexed optical signal by combining the modulated optical signals X and Y. The polarization multiplexed optical signal is guided to an output port via an optical waveguide.

The optical device 100 may include other elements that are not depicted in FIG. 1. For example, the optical device 100 may include an optical receiver in addition to the optical modulator. In this case, the optical device 100 is operated as an optical transceiver.

Figure 2:
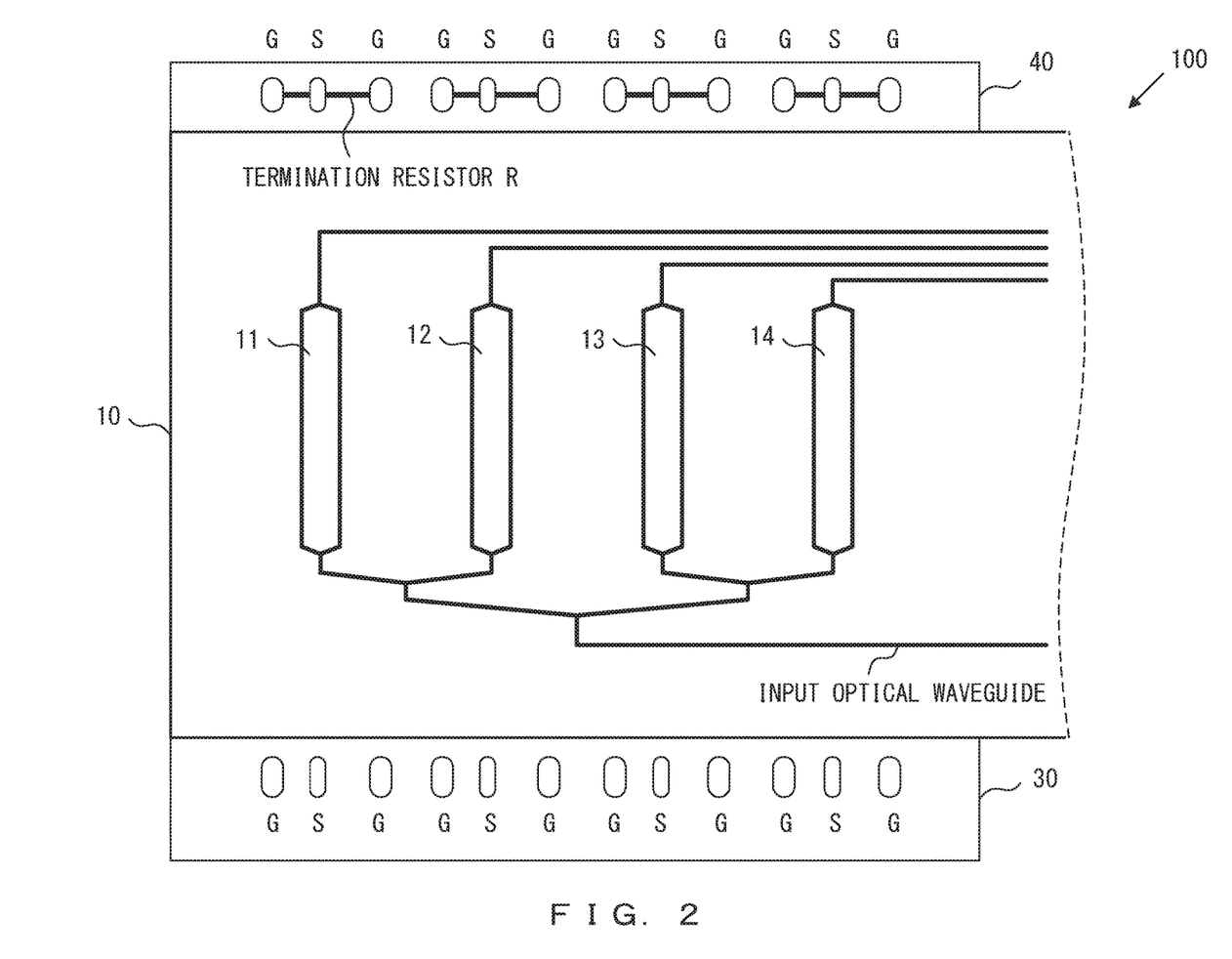
FIG. 2 illustrates optical waveguides forming a modulator.
Figure 3:
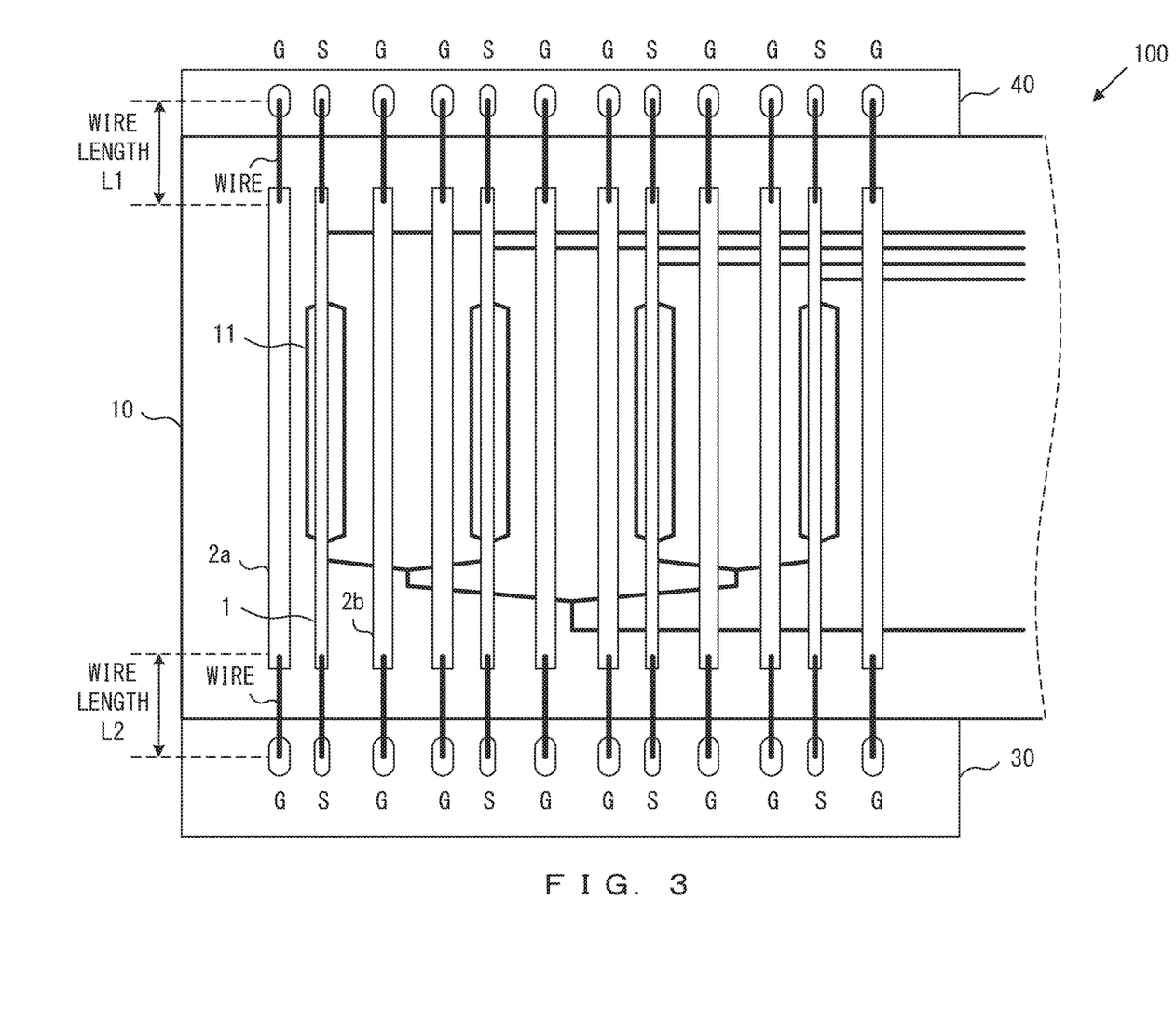
FIG. 3 illustrates optical waveguides and wiring patterns forming a modulator.
Figure 4:
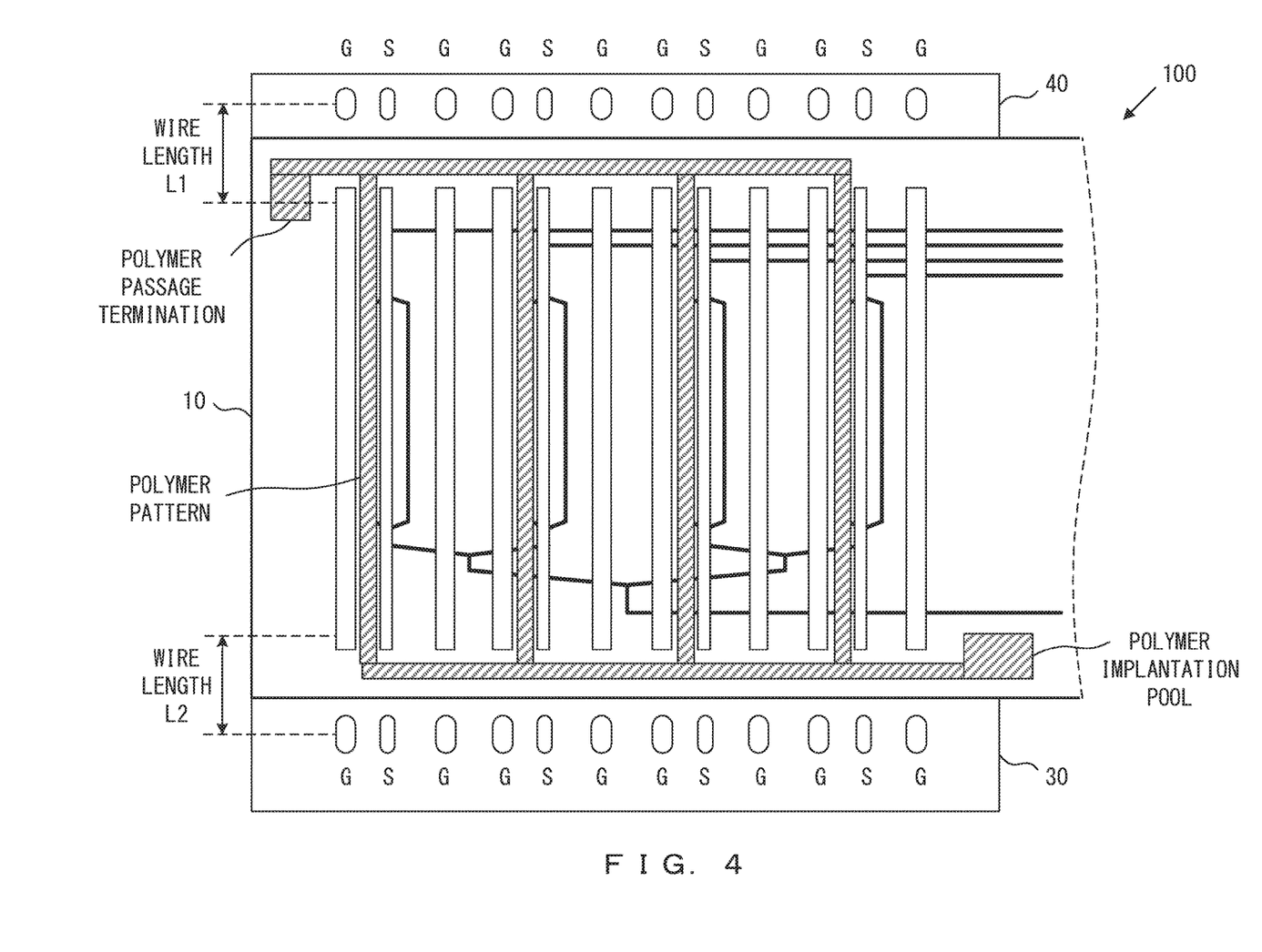
FIG. 4 illustrates optical waveguides, wiring patterns, and polymer patterns forming a modulator.

FIGS. 2-4 illustrate an example of the configuration of an optical modulator. Note that FIGS. 2-4 depict the modulators 11-14 depicted in FIG. 1, and the variable optical attenuators 15$x$ and 15$y$, the monitor photodetectors 16$x$ and 16$y$, the polarization rotator 17, and the polarization beam combiner 18 illustrated in FIG. 1 are not depicted in FIGS. 2-4.

FIG. 2 illustrates optical waveguides forming modulators 11-14. In this example, each of the modulators 11-14 is implemented using a Mach-Zehnder interferometer. In particular, each of the modulators 11-14 includes a pair of optical waveguides. The pair of optical waveguides are substantially the same in length and formed substantially parallel to each other. An input optical waveguide is optically coupled to an input terminal of each of the modulators 11-14. Accordingly, continuous wave light input to the optical device 100 is guided to the modulators 11-14 via the input optical waveguide, as depicted in FIG. 1.

The optical device 100 includes a driver board 30 and a terminator board 40, as depicted in FIG. 2. The driver board 30 is provided with signal pads and ground pads. In FIGS. 2-4, S represents a signal pad, and G represents a ground pad. In this example, one signal pad S and two ground pads G are provided for each of the modulators 11-14. A signal pad S is provided between two ground pads G. The signal pads S are connected to a drive circuit for generating a drive signal. The ground pads G are connected to a ground. The drive circuit may be implemented on the driver board 30 or may be provided outside the driver board 30.

The terminator board 40 is also provided with signal pads S and ground pads G. In this example, one signal pad S and two ground pads G are provided for each of the modulators 11-14. A signal pad S is provided between two ground pads G. Termination resistors R are provided between the signal pads S and the ground pads G. The termination resistors R are not depicted in FIGS. 3-4.

FIG. 3 illustrates optical waveguides and wiring patterns forming modulators 11-14. Each of the wiring patterns is formed parallel to an optical waveguide forming a Mach-Zehnder interferometer. Each of the wiring patterns is electrically connected to corresponding pads of the driver board 30 and the terminator board 40 via wires.

For example, the modulator 11 may include wiring patterns 1, 2$a$, and 2$b$. The wiring pattern 1 is formed to overlap a Mach-Zehnder interferometer. The wiring pattern 1 is connected to a corresponding signal pad S provided on the driver board 30 and a corresponding signal pad S provided on the terminator board 40 via wires. The wiring patterns 2$a$ and 2$b$ are formed to sandwich the Mach-Zehnder interferometer. Each of the wiring patterns 2$a$ and 2$b$ is connected to a corresponding ground pad G provided on the driver board 30 and a corresponding ground pad G provided on the terminator board 40 via wires. The wires are implemented using a metal with a high conductivity. The configurations of the modulators 12-14 are substantially the same as that of the modulator 11.

FIG. 4 illustrates optical waveguides, wiring patterns, and polymer patterns forming modulators 11-14. In this example, for each of the modulators 11-14, a polymer pattern is formed along one of a pair of optical waveguides forming a Mach-Zehnder interferometer. Note that the polymer patterns are represented by hatched regions. The polymer patterns are formed by applying an electro-optical polymer (EO polymer) to the optical IC chip 10.

FIGS. 5A-7B illustrate an example of fabrication process for an optical modulator. The following describes an example of a procedure for forming optical waveguides, wiring patterns, and polymer patterns on an optical IC chip. In this example, an optical modulator is formed using an SOI substrate depicted in FIG. 5A. The SOI substrate includes a silicon substrate, a Si layer, and a BOX layer (SiO$_2$ film) as an insulation layer between the silicon substrate and the Si layer.

Figure 5A:
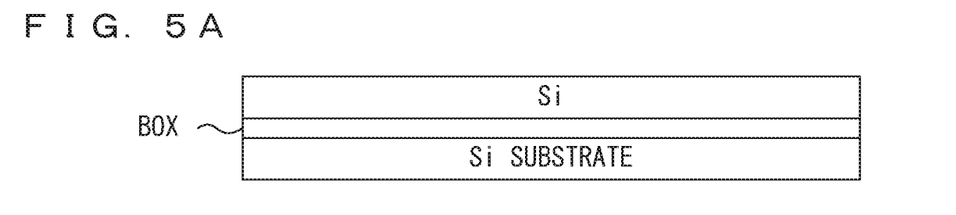
FIGS. 5A-5D, 6A-6D, and 7A-7B illustrate an example of fabrication process for an optical modulator.
Figure 5B:
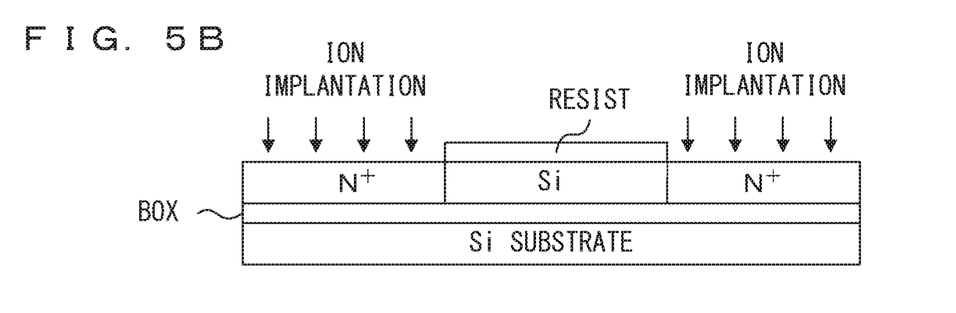

In FIG. 5B, N$^+$ regions are formed in the Si layer. In this case, the N$^+$ regions are formed by selectively implanting N-type ion into the Si layer by means of a resist film. Note that the N+ regions are formed in the vicinity of a region in which an optical waveguide is to be formed in a later process.

Figure 5C:
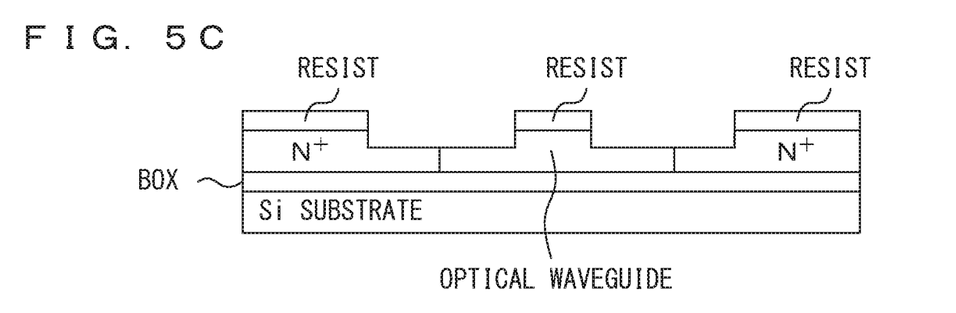

In FIG. 5C, an optical waveguide is formed. In this case, the optical waveguide is formed by etching the Si layer and the N+ regions by means of the resist film.

Figure 5D:
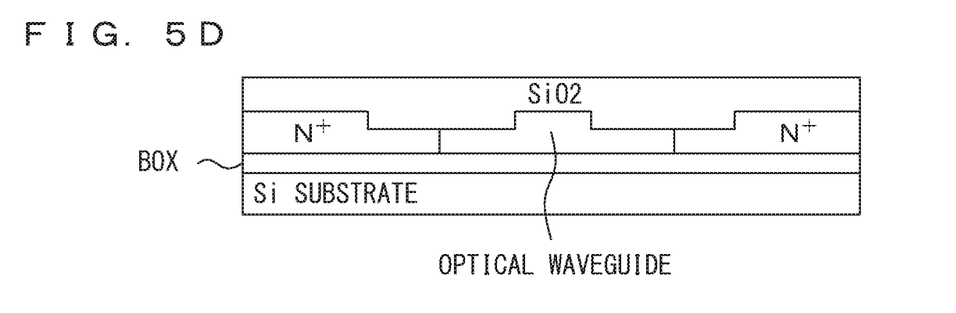
Figure 6A:
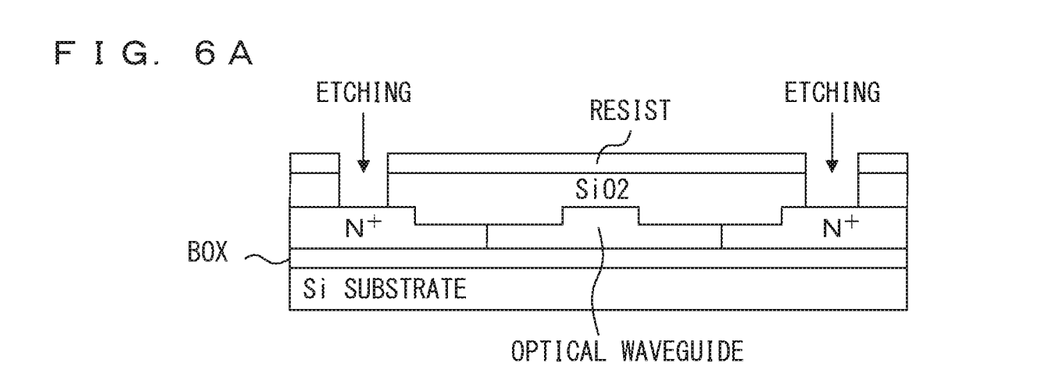
Figure 6B:
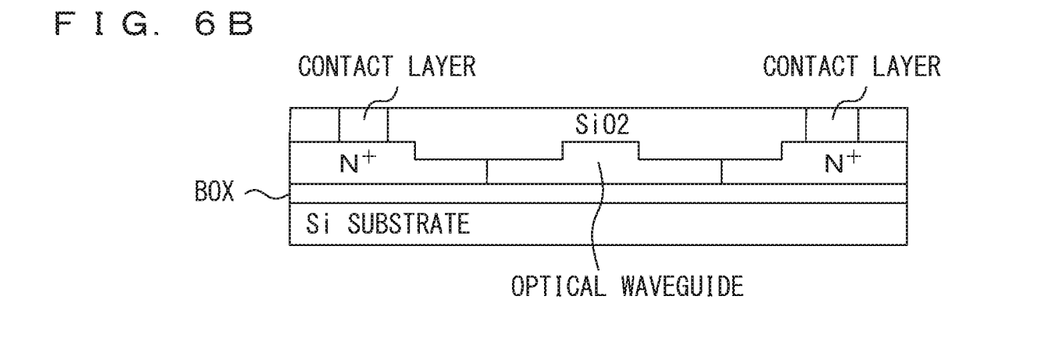

In FIGS. 5D-6B, contact layers are formed. In particular, an oxide film is formed over surfaces of the Si layer and the N+ regions, as depicted in FIG. 5D. Then, as depicted in FIG. 6A, portions of the oxide film over the surfaces of the N+ regions are removed via etching by means of a resist film. As a result, contact layers are formed in oxide-film-removed regions, as depicted in FIG. 6B. That is, contact layers to be electrically connected to the N+ regions are formed.

Figure 6C:
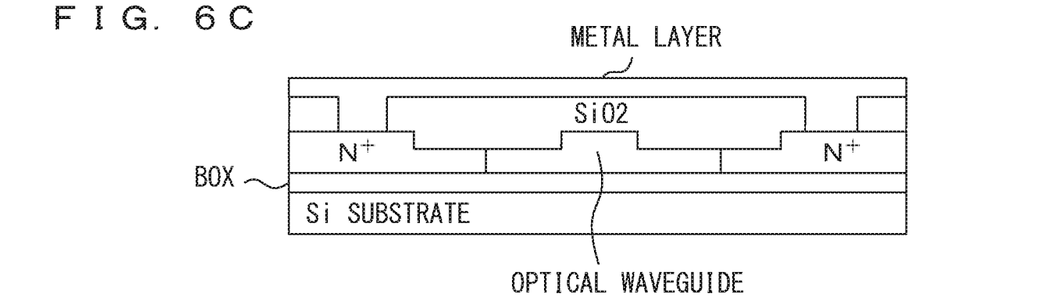
Figure 6D:
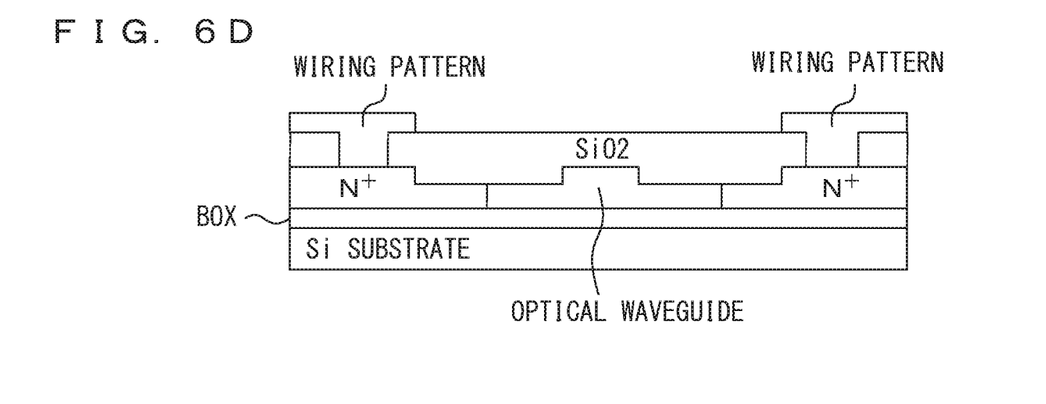

In FIGS. 6C-6D, wiring patterns are formed. In particular, a metal layer is formed over the surface of the oxide film, as depicted in FIG. 6C. Then, wiring patterns are formed by selectively removing the metal layer, as depicted in FIG. 6D.

Figure 7A:
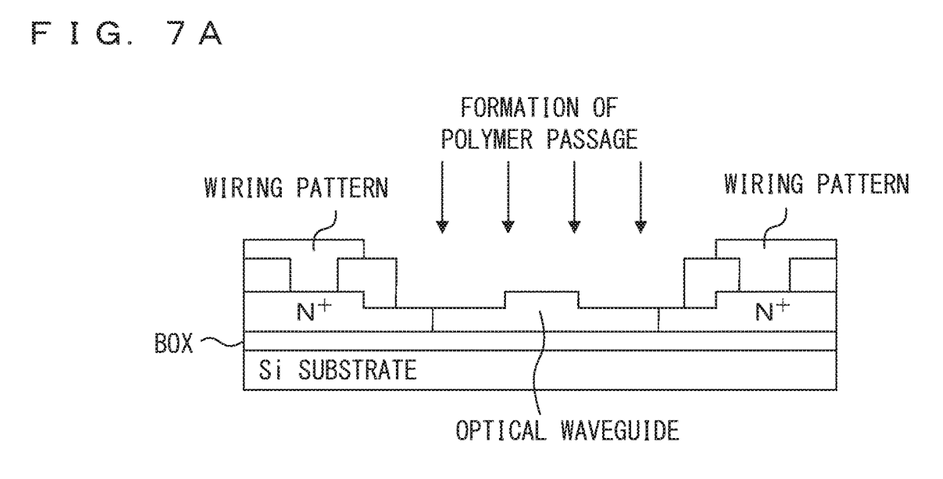
Figure 7B:
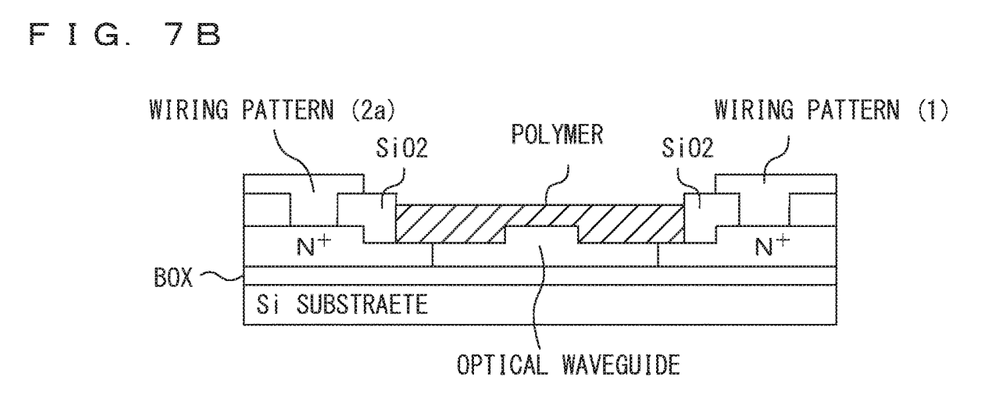

In FIGS. 7A-7B, a polymer pattern is formed. In particular, as depicted in FIG. 7A, a polymer passage is formed by selectively removing the oxide film formed over the surface of the optical IC chip 10. Then, the polymer pattern depicted in FIG. 4 is formed by pouring a polymer material through the polymer passage. In this case, the polymer pattern is formed in contact with the optical waveguide, as depicted in FIG. 7B. Specifically, a polymer pattern is formed in contact with one of a pair of optical waveguides forming a Mach-Zehnder interferometer. Subsequently, as depicted in FIG. 3, each wiring pattern and a corresponding pad on the driver board 30 and each wiring pattern and a corresponding pad on the terminator board 40 are connected by metal wires.

Assume, for example, that the two wiring patterns depicted in FIG. 7B are the wiring patterns 1 and 2a depicted in FIG. 3 and the optical waveguide depicted in FIG. 7B is one of the optical waveguides of the Mach-Zehnder interferometer forming the modulator 11 depicted in FIGS. 2-3. In this case, the drive signal of the modulator 11 is applied to the polymer pattern via the wiring pattern 1 and the N+ region in contact with the wiring pattern 1. The polymer pattern is electrically connected to a ground via the N+ region and the wiring pattern 2a. Thus, an electric field corresponding to the drive signal is applied to the polymer pattern, resulting in a change in the refractive index of the optical waveguide in accordance with the drive signal. Accordingly, modulation corresponding to the drive signal is implemented.

As described above, the polymer pattern for applying an electric field to the optical waveguide is formed by forming a polymer passage on the surface of the optical IC chip 10 and implanting a polymer material through the polymer passage. In the example depicted in FIG. 4, a polymer material is implanted into a polymer implantation pool and then caused to flow toward a polymer passage termination, thereby forming polymer patterns.

However, the polymer patterns are formed on the surface of the optical IC chip 10 without overlapping the wiring patterns. For example, in the configuration depicted in FIG. 4, the following polymer patterns may be formed between the polymer implantation pool and the polymer passage termination.

(1) An input-side polymer pattern formed along an edge in contact with the driver board 30.

(2) Channel polymer patterns formed on the optical waveguides of the modulators 11-14 and connected to the input-side polymer pattern.

(3) An output-side polymer pattern formed along an edge in contact with the terminator board 40 and connected to the channel polymer patterns.

However, in this configuration, since the input-side polymer pattern and the output-side polymer pattern are formed on edge portions of the optical IC chip 10, wiring patterns (i.e., electrodes for the optical modulator) cannot be formed near the edge portions of the optical IC chip 10. Specifically, wiring patterns cannot be formed in a region adjacent to the driver board 30 on the surface of the optical IC chip 10 and a region adjacent to the terminator board 40 on the surface of the optical IC chip 10. Hence, long metal wires are needed to connect the wiring patterns to corresponding pads on the driver board 30 and to connect the wiring patterns to corresponding pads on the terminator board 40. Thus, wire lengths L1 and L2 will be increased. Due to the long metal wires, it will be difficult to attain impedance matching of the signal lines. As a result, the bandwidth of the optical modulator could be narrow when reflection of an electric signal occurs on the optical IC chip due to impedance mismatching.

EMBODIMENTS

Figure 8:
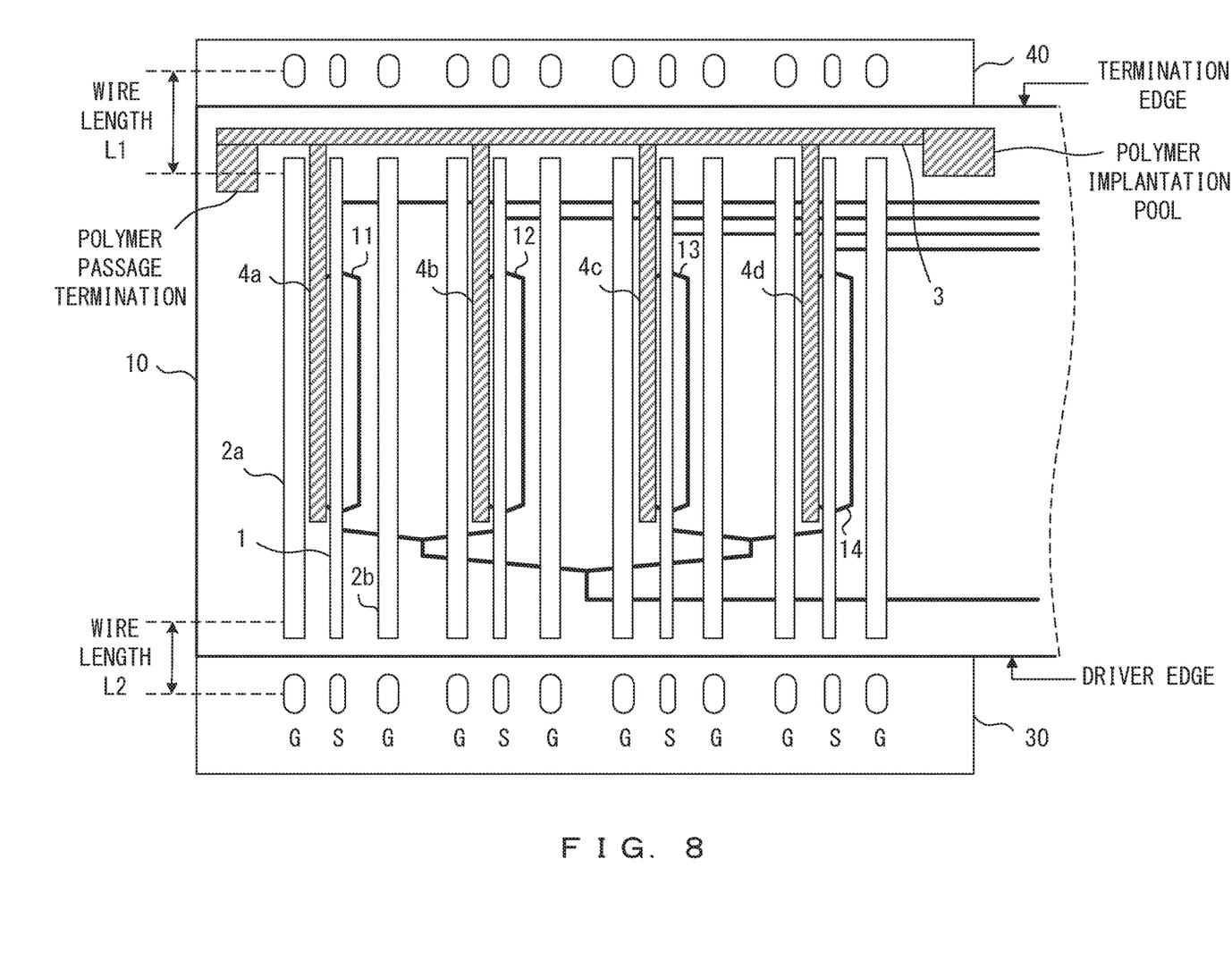
FIG. 8 illustrates an example of an optical modulator in accordance with embodiments of the invention.

FIG. 8 illustrates an example of an optical modulator in accordance with embodiments of the invention. The optical IC chip 10 is shaped like a rectangle (or parallelogram), as depicted in FIG. 1. Optical waveguides formed on the surface of the optical IC chip 10 depicted in FIG. 8 are substantially the same as those depicted in FIG. 2. Wiring patterns (1, 2a, 2b, and the like) formed on the surface of the optical IC chip 10 depicted in FIG. 8 are substantially the same as those depicted in FIG. 3. The driver board 30 and the terminator board 40 depicted in FIG. 8 are substantially the same as those depicted in FIGS. 2-4. For example, the optical waveguides, the wiring patterns, and the polymer patterns may be formed using the procedures depicted in FIGS. 5A-7B. Note that the metal wires depicted in FIG. 3 are present but are not depicted in FIG. 8.

In the embodiment depicted in FIG. 8, an inflow-passage polymer pattern 3 and channel polymer patterns 4a-4d are formed on the optical IC chip 10. The inflow-passage polymer pattern 3 is formed along an edge to which the driver board 30 is adjacent or an edge to which the terminator board 40 is adjacent among four edges of the optical IC chip 10. In this example, the inflow-passage polymer pattern 3 is formed along the edge to which the terminator board 40 is adjacent. The edge to which the driver board 30 is adjacent will hereinafter be referred to as a "driver edge", and the edge to which the terminator board 40 is adjacent will hereinafter be referred to as a "termination edge".

The channel polymer patterns 4a-4d are respectively connected to the inflow-passage polymer pattern 3. In this example, the channel polymer patterns 4a-4d are respectively formed in a direction substantially orthogonal to the inflow-passage polymer pattern 3. The channel polymer patterns 4a-4d are respectively formed on one of a pair of optical waveguides forming a corresponding Mach-Zehnder interferometer (see FIG. 7B). For example, the channel polymer pattern 4a may be formed on one of a pair of optical waveguides forming the modulator 11. Similarly, channel polymer patterns 4b, 4c, and 4d are formed on optical waveguides of the modulators 12, 13, and 14, respectively. The channel polymer patterns 4a-4d are formed on the optical IC chip 10 without overlapping the wiring patterns (1, 2a, 2b, and the like).

The inflow-passage polymer pattern 3 and the channel polymer patterns 4a-4d are formed by forming a polymer passage on the surface of the optical IC chip 10 and implanting a polymer material through the polymer passage, as depicted in FIG. 7A. In particular, a polymer material is implanted into the polymer implantation pool depicted in FIG. 8. Thus, the polymer material flows toward a polymer passage termination. During this process, the polymer material flows through the polymer passage and thus flows not only in a direction from the polymer implantation pool toward the polymer passage termination but also in a direction orthogonal to the direction from the polymer implantation pool toward the polymer passage termination. As a result, the inflow-passage polymer pattern 3 and the channel polymer patterns 4a-4d are formed.

The optical IC chip 10 may be inclined in the process of causing the polymer material to flow through the polymer passage. In this case, for example, the optical IC chip 10 may be inclined such that the termination edge is located higher than the driver edge.

As described above, in the embodiment depicted in FIG. 8, the polymer pattern (i.e., inflow-passage polymer pattern 3) is formed along one of the driver edge or the termination edge, but a polymer pattern is not formed at the other edge. Hence, short metal wires can be used to connect the wiring patterns on the optical IC chip 10 to the driver board 30 or to connect the wiring patterns on the optical IC chip 10 to the terminator board 40. In this example, the inflow-passage polymer pattern 3 is formed along the termination edge of the optical IC chip 10, but a polymer pattern is not formed along the driver edge of the optical IC chip 10. Hence, short metal wires can be used to connect the wiring patterns on the optical IC chip 10 to the driver board 30. In particular, the wire length L2 in the embodiment depicted in FIG. 8 is less than that in the configurations depicted in FIGS. 3-4.

The short metal wires allow the impedances of each of the signal lines to be easily matched. Accurately matching the impedances will reduce reflection of an electric signal on the optical IC chip, thereby widening the bandwidth of the optical modulator. Accordingly, the configuration in accordance with embodiments of the invention contributes to speed-enhancement of optical signals.

As described above, the inflow-passage polymer pattern 3 is formed along one of the driver edge or the termination edge of the optical IC chip 10. However, in a configuration in which a drive signal is input from the driver board 30 to the optical IC chip 10, the amplitude of a signal propagating through the metal wires between the driver board 30 and the optical IC chip 10 is larger than the amplitude of a signal propagating through the metal wires between the optical IC chip 10 and the terminator board 40. Hence, the influence of impedance mismatching between the driver board 30 and the optical IC chip 10 will be larger than the influence of impedance mismatching between the optical IC chip 10 and the terminator board 40. Thus, in order to reduce an influence of impedance mismatching, it is preferable to shorten metal wires between the driver board 30 and the optical IC chip 10 than to shorten metal wires between the optical IC chip 10 and the terminator board 40. Accordingly, the inflow-passage polymer pattern 3 will preferably formed along the termination edge, as depicted in FIG. 8.

Variation 1

Figure 9:
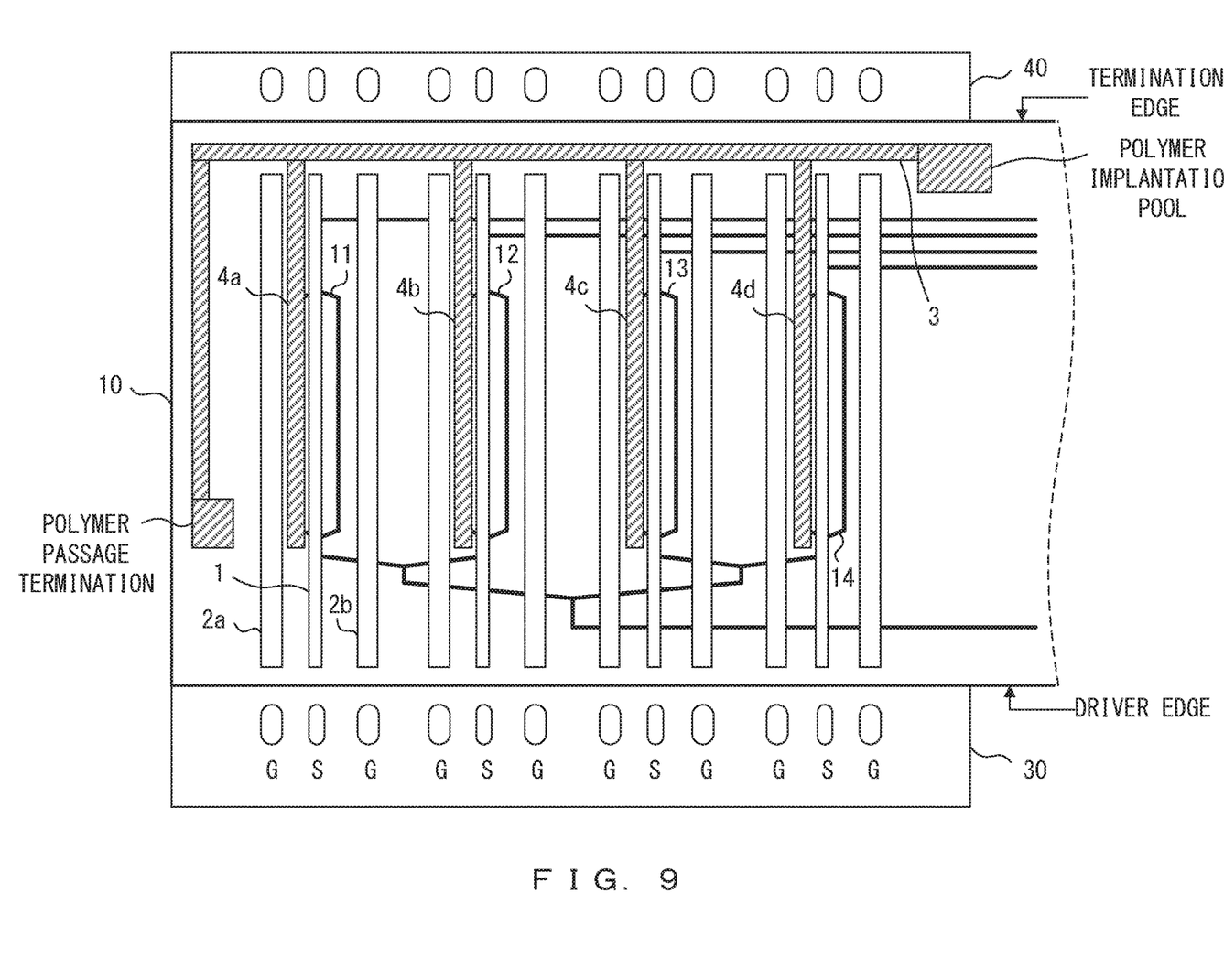
FIG. 9 illustrates a variation of an optical modulator in accordance embodiments of the invention.

In the configuration depicted in FIG. 9, the inflow-passage polymer pattern 3 is formed along the termination edge and also extends along a side edge of the optical IC chip 10. That is, the inflow-passage polymer pattern 3 also extends in a direction parallel to the channel polymer patterns 4a-4d. A polymer passage termination is provided at an end of the inflow-passage polymer pattern 3. Note that the width and length of the inflow-passage polymer pattern 3 formed along the side edge are substantially the same as those of the channel polymer patterns 4a-4d.

According to this configuration, when the polymer material implanted into the polymer implantation pool arrives at the polymer passage termination in the process of forming the polymer patterns, the polymer pattern is considered to have arrived at the ends of the channel polymer patterns 4a-4d. Accordingly, it can be decided whether sufficient polymer material has arrived at the ends of the channel polymer patterns 4a-4d by monitoring as to whether the polymer material has arrived at the polymer passage termination.

Variation 2

As described above, the inflow-passage polymer pattern 3 is formed along one of the driver edge or the termination edge of the optical IC chip 10. The channel polymer patterns 4a-4d are connected to the inflow-passage polymer pattern 3. Thus, a free space is present in a region in the vicinity of the edge at which the inflow-passage polymer pattern 3 is not formed.

Figure 10:
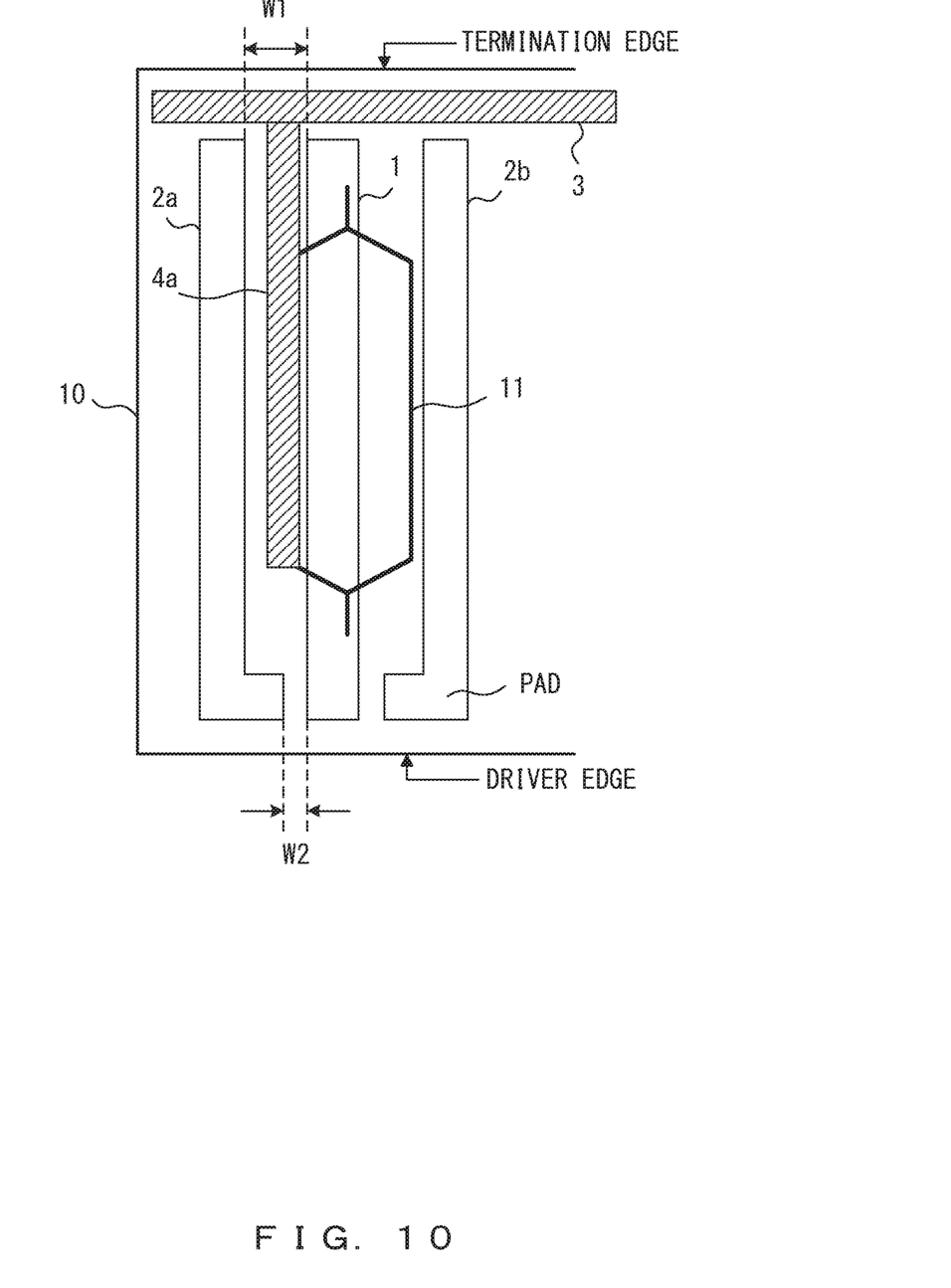
FIG. 10 illustrates a variation of wiring patterns.
Figure 11:
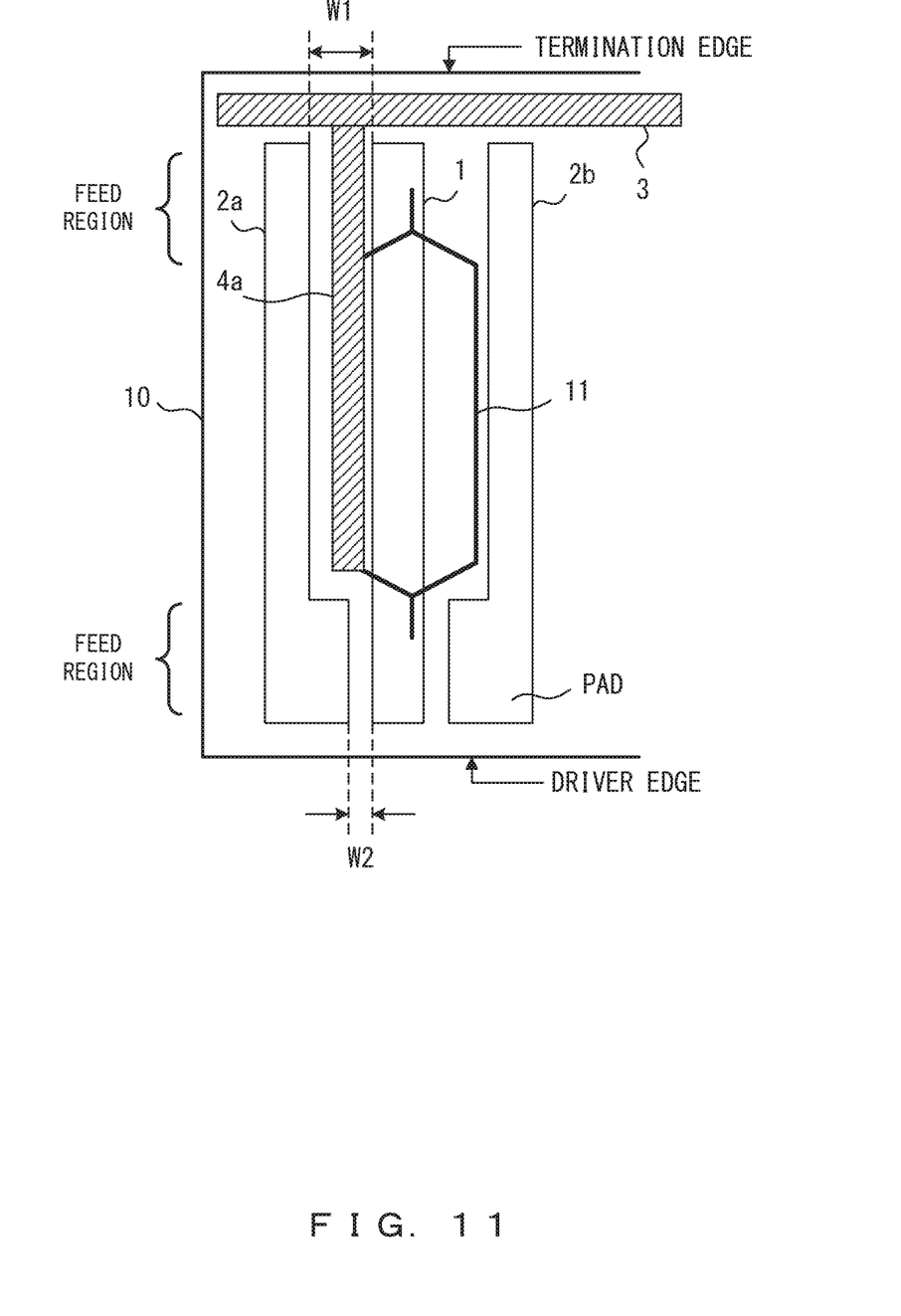
FIG. 11 illustrates another variation of wiring patterns.

In the examples depicted in FIGS. 10-11, the inflow-passage polymer pattern 3 is formed along the termination edge of the optical IC chip 10. The channel polymer pattern 4a is formed between the wiring patterns 1 and 2a. Hence, there is no free space between the wiring patterns 1 and 2a in a region close to the termination edge but there is no free space between the wiring patterns 1 and 2a in a region close to the driver edge. Accordingly, in variation 2, the impedances are decreased using the free space.

In the example depicted in FIG. 10, the areas of pads formed at the ends of the wiring patterns on the driver-edge side are larger than the areas of pads formed at the ends of the wiring patterns on the termination-edge side. Hence, the spacing between the pads of the wiring pattern 1 and each of the wiring patterns 2a and 2b that are formed in the vicinity of the driver edge (W2) is smaller than the spacing between the pads of the wiring pattern 1 and each of the wiring patterns 2a and 2b that are formed in the vicinity of the termination edge (W1). As a result, the impedances between the pads are decreased and thus can be accurately matched.

In the example depicted in FIG. 11, the wiring patterns are wide in a feed region on the driver-edge side. Hence, the spacing between the wiring pattern 1 and each of the wiring patterns 2a and 2b in the feed region on the driver-edge side (W2) is smaller than the spacing between the wiring pattern 1 and each of the wiring patterns 2a and 2b in a feed region on the termination-edge side (W1). As a result, the impedances between the pads are decreased and thus can be accurately matched.

In the examples depicted in FIGS. 10-11, the spacing between the wiring patterns are small on the driver-edge side. However, the invention is not limited to this configuration. In particular, the spacing between the wiring patterns are small on the termination-edge side when the inflow-passage polymer pattern 3 is formed along the driver edge of the optical IC chip 10.

Transceiver Module

Figure 12:
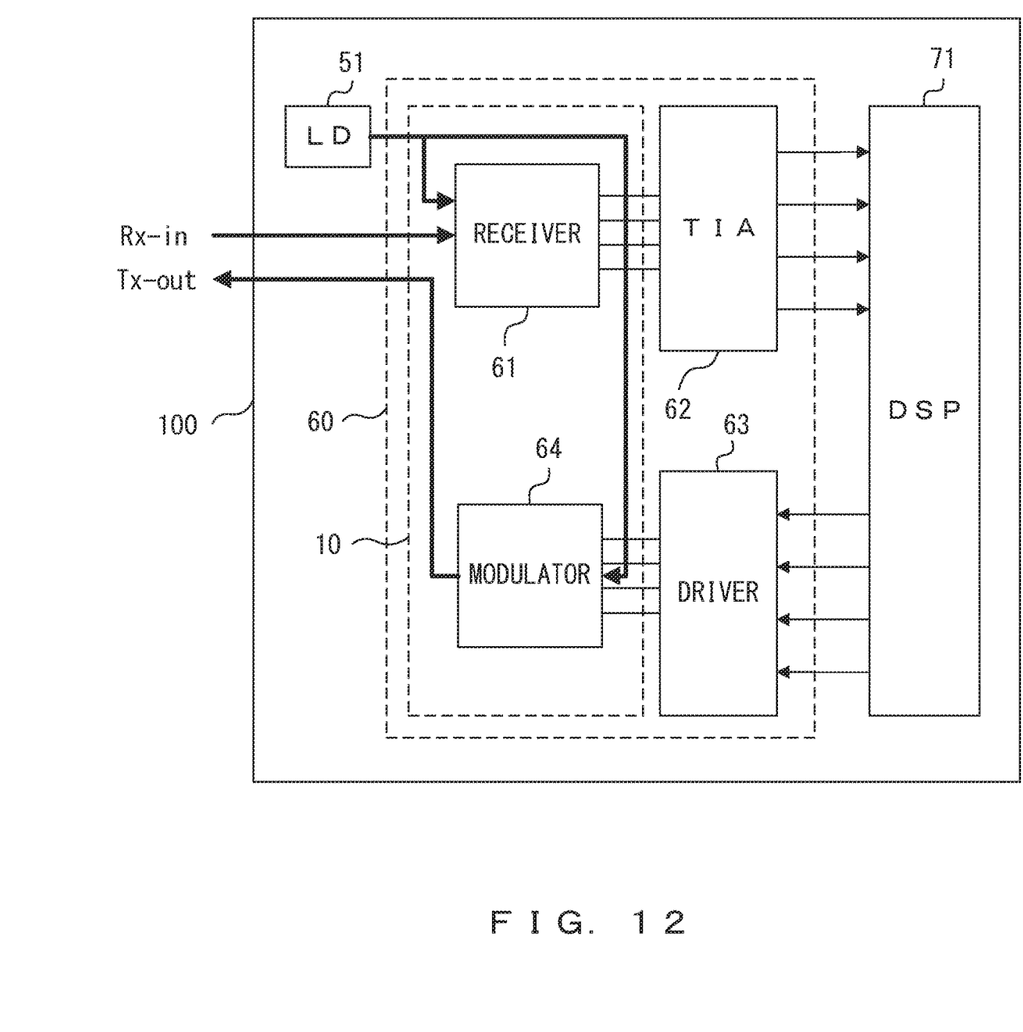
FIG. 12 illustrates an example of an optical device that includes a transceiver module.

FIG. 12 illustrates an example of an optical device that includes a transceiver module. In this example, an optical device 100 includes a light source 51, a transceiver package 60, and a DSP 71. The transceiver package 60 includes a receiver 61, a TIA circuit 62, a driver circuit 63, and a modulator 64. For example, the receiver 61 and the modulator 64 may be implemented in the optical IC chip 10 depicted in FIG. 8 or 9. The modulator 64 is implemented by, for example, the configuration depicted in FIG. 8 or 9. The optical device 100 may include elements that are not depicted in FIG. 12.

The light source 51 generates continuous wave light of a specified wavelength. The continuous wave light is guided to the modulator 64 via an optical waveguide formed on the optical IC chip 10. When the receiver 61 is a coherent receiver, the continuous wave light is also guided to the receiver 61.

A received optical signal (Rx_in) is guided to the receiver 61. For example, the receiver 61 may be a coherent receiver. In this case, the receiver 61 generates an electric-field-information signal indicating the received optical signal by using continuous wave light generated by the light source 51. The TIA circuit 62 converts the electric-field-information signal generated by the receiver 61 into a voltage signal and amplifies the voltage signal.

The DSP (digital signal processor) 71 recovers reception data from an electric-field-information signal indicating a received optical signal. Functions for recovering the reception data may include a function for compensating for frequency offset, a function for compensating for waveform distortion, and a function for estimating a phase. The DSP 71 also generates a drive signal from transmission data. Functions for generating the drive signal may include a function for mapping in accordance with a modulation scheme.

The drive signal is amplified by the drive circuit 63 and guided to the modulator 64. The driver circuit 63 may be implemented in the driver board 30 depicted in FIG. 8 or 9. The modulator 64 generates a modulated optical signal (Tx_out) by modulating continuous wave light with a drive signal supplied via the driver circuit 63.

The size of the transceiver module can be reduced by implementing the receiver 61 and the modulator 64 on the optical IC chip, as described above. Implementing the modulator 64 in the configuration depicted in FIG. 8 or 9 allows reflection of an electric signal on the optical IC chip to be reduced, thereby widening the transmission bandwidth.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical device that includes an optical modulator formed on an optical IC (Integrated Circuit) chip shaped like a rectangle or a parallelogram, wherein the optical modulator comprises:
    an interferometer that includes an optical waveguide formed in a direction from a first edge to a second edge of the optical IC chip, the first edge being in parallel to the second edge,
    wiring patterns that are formed parallel to the optical waveguide,
    a first polymer pattern that is formed along the first edge or the second edge, and
    a second polymer pattern that is connected to the first polymer pattern and formed on the optical waveguide without overlapping the wiring patterns.

2. The optical device according to claim 1, wherein an input terminal of the interferometer is configured in a vicinity of the first edge,
    an output terminal of the interferometer is configured in a vicinity of the second edge, and
    the first polymer pattern is formed along the second edge.

3. The optical device according to claim 1, wherein the wiring patterns include
    a first wiring pattern to which a drive signal of the optical modulator is supplied, and
    a second wiring pattern connected to a ground, wherein the first polymer pattern is formed along the second edge, and
    a spacing between a pad provided at an end of the first wiring pattern in a vicinity of the first edge and a pad provided at an end of the second wiring pattern in the vicinity of the first edge is smaller than a spacing between a pad provided at an end of the first wiring pattern in a vicinity of the second edge and a pad provided at an end of the second wiring pattern in the vicinity of the second edge.

4. The optical device according to claim 1, wherein the wiring patterns include
    a first wiring pattern to which a drive signal of the optical modulator is supplied, and
    a second wiring pattern connected to a ground, wherein the first polymer pattern is formed along the second edge, and
    a spacing between the first wiring pattern and the second wiring pattern that are formed in a feed region between the interferometer and the first edge is smaller than a spacing between the first wiring pattern and the second wiring pattern that are formed in a feed region between the interferometer and the second edge.

5. The optical device according to claim 1, wherein an optical receiver is further formed on the optical IC chip.

* * * * *